INVENTOR

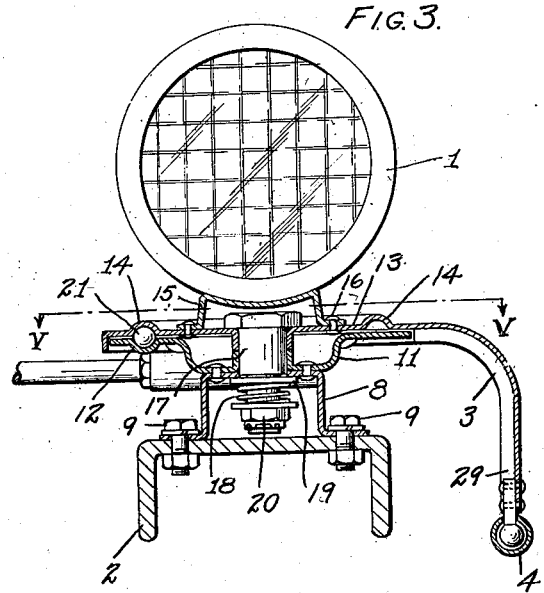
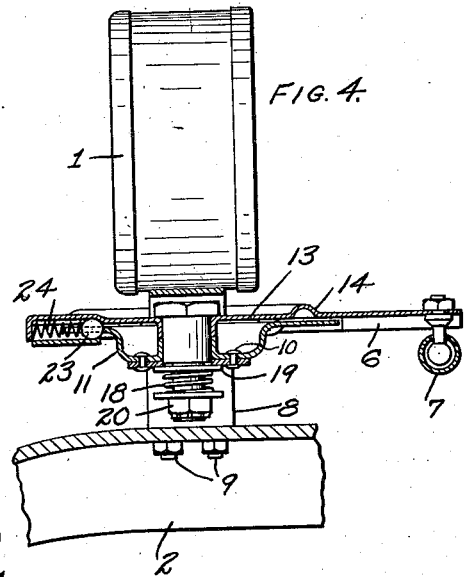
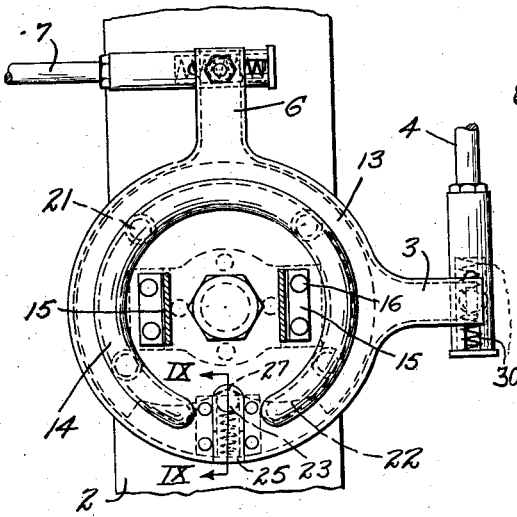
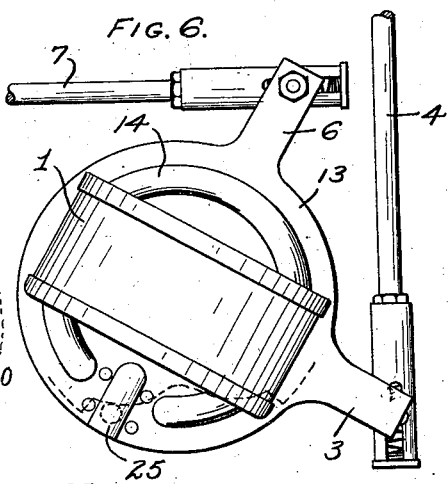
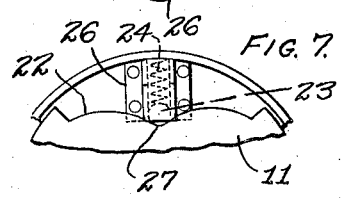
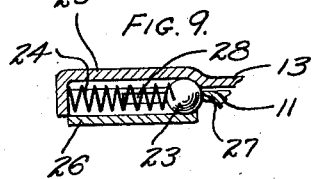

Patented June 24, 1930

1,765,813

UNITED STATES PATENT OFFICE

LAWRIE L. WITTER, OF JAMAICA PLAIN, MASSACHUSETTS

DIRIGIBLE HEADLIGHT

Application filed June 16, 1928. Serial No. 285,903.

This invention relates to automobile headlights of the dirigible type adapted to be automatically swiveled in a horizontal plane in conformity to the movement of the steering mechanism whereby to always illuminate the road in the direction in which the vehicle is moving. The light or lights are connected to and adapted to be turned by the steering mechanism and the particular object of the invention herein is to provide an improved and inexpensive mounting for the light and means in connection therewith for normally holding the light centered in a forwardly directed position and in a manner preventing vibration thereof.

When a dirigible headlight is connected directly to the steering mechanism of a vehicle the vibrations of the vehicle will be directly imparted to the headlight through such connection unless means is provided for preventing the same. In my invention herein I provide a loose joint in such connection and provide a resilient means acting directly on the swiveled portion of the light support to normally hold the light centered in its forwardly directed position and adapted to automatically take up the looseness in such connection whenever the light is turned in either direction from its normal position. This resilient means thereby serves the double function of holding the light against vibration and normally centered forwardly. It will furthermore be noted that my improved construction, as illustrated in the accompanying drawings, permits of very cheap manufacture from pressed sheet metal and is so designed as to form a housing completely shielding the parts from dust and grit. It is a further object of my invention to provide a dirigible vehicle light having these improved features.

In the accompanying drawings I have illustrated certain specific embodiments of my invention but it will be understood that the invention can be otherwise embodied and that the drawings are not to be construed as defining or limiting the scope of the invention, the claims appended hereto being relied upon for that purpose.

Referring to the figures of the drawings:

Fig. 3 is a front view of one of the lights, the mounting thereof being shown in vertical section.

Fig. 4 is a side view of one of the lights, the mounting thereof being shown in vertical section.

Fig. 5 is a plan view taken on line V—V of Fig. 3.

Fig. 6 is a plan view showing the light in a swiveled position.

Fig. 7 is a bottom plan view of a portion of Fig. 5.

Fig. 8 is a fragmentary front view of Fig. 5.

Fig. 9 is a detail view taken on line IX—IX of Fig. 5.

Figure 1:
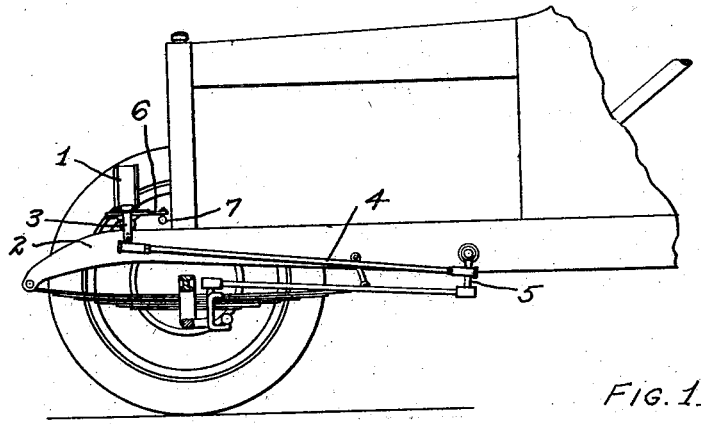
Fig. 1 is a side elevation of a vehicle equipped with my invention.

In the drawings a pair of headlights 1 are illustrated as mounted on the forward frame portions 2 of an automobile. These lights are mounted for swiveling movement in a horizontal plane as hereinafter described. An arm 3 on one of the lights is connected by a rod 4 to the usual arm 5 of the steering mechanism. Rearwardly extending arms 6 on the two lights are connected by a rod 7. Obviously when the steering mechanism functions the lights will be swiveled accordingly.

The support for the light comprises a base 8 adapted to be secured to the frame by bolts 9. Secured to the top of this base by rivets 10 is a piece 11 having a central bolt receiving opening and an outer horizontal supporting surface provided with ball sockets 12 therein. This piece 11 is the stationary part of the support and receives the swiveled part thereon. The swiveled part comprises a piece 13 having a central bolt receiving opening coaxial with the opening in the piece 11 and provided with ball raceways 14 cooperating with the sockets 12. The light 1 is supported on a bridge 15 secured to the piece 13 by rivets 16.

The two pieces 11 and 13 are held in the assembled relation illustrated by means of a bolt 17 passing downwardly through their coaxial openings. A strong expansion spring 18 on the bolt between a washer 19 and a washer and nut 20 serves to hold the parts together. Steel ball-bearings 21 are provided in the sockets 12 and raceways 14 to prevent freezing of the parts and to aid their swiveling cooperation.

A portion of the edge of the stationary bottom piece 11 is cut away to provide an edge bearing 22 against which acts a ball 23 resiliently forced against such bearing by a spring 24. This spring and the ball are carried in a housing 26 secured to an upset portion 25 of the swivel top piece 13. It will be noted that the edge bearing 22 is somewhat V-shaped and that when the light is centered forwardly (Fig. 5) the ball rests in the apex 27 of the bearing. The sides of the ball housing 26 are slotted at 28 to permit the entrance of the bottom plate 11 when the light is turned.

Figure 10:
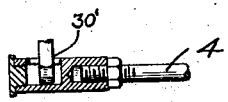
Fig. 10 is a detail view showing a modified form of connection.

As shown in Fig. 3 a downwardly bent arm 3 is provided on one side of the piece 13 and its free end 29 has a loose connection to the rod 4. This connection, as shown in Fig. 5, may be between a pair of springs 30 or may be an entirely loose connection as shown at 30' in Fig. 10. The purpose of this connection is to prevent the transmitting of every slight movement, especially vibrations, of the steering mechanism to the light.

When the steering mechanism is in the forward position the ball 23 under the action of the spring 24 rests in the apex 27 of the bearing 22. In such position the ball and spring not only serve to hold the light centered in its forwardly directed position but also serve to hold the light against vibration. When the steering mechanism is operated the light is swiveled, but always against the action of the spring 24. This action of the spring therefore always operates to take up the lost motion or looseness in the connection to the steering mechanism.

It is believed that the advantages of my invention as herein set forth and illustrated will be obvious. I particularly desire to emphasize the novel construction illustrated and the resilient holding means acting directly therewith at the light support. This arrangement leaves no intermediate connections to become loose between the light holding means and the light, and the lights are therefore at all times held against vibration whether they be in their normal forwardly directed position or in any turned position.

It should also be noted that the top piece 13 cups over the piece 11 in a manner completely housing such piece 11 and the parts therein.

Figure 13:
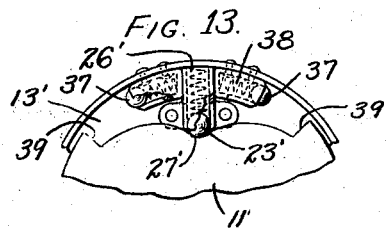
Fig. 13 is a further modification of the form shown in Figs. 1 to 10.

In Fig. 13 I have illustrated the construction shown in Fig. 7 as supplemented by a pair of spring pressed balls 37 and housings 38 carried by the top plate 13' at opposite sides of the housing 26'. The balls 37 are adapted to engage against the shoulders 39 of the bottom stationary plate 11'. It is obvious that the ball 23' cooperating with its socket 27' is sufficient to center the light and to sufficiently resist turning of the light for a considerable distance in either direction. However it may be advisable to provide additional means for resisting the turning of the light beyond a point wherein the ball 23' provides sufficient resistance to entirely take up the lost motion or looseness in the connection to the steering mechanism. The spring pressed balls 37 are illustrated as providing this additional means.

Figure 11:
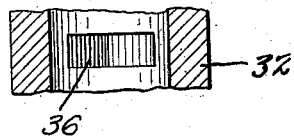
Figs. 11 and 12 are fragmentary sectional views showing a modified form of the invention.
Figure 2:
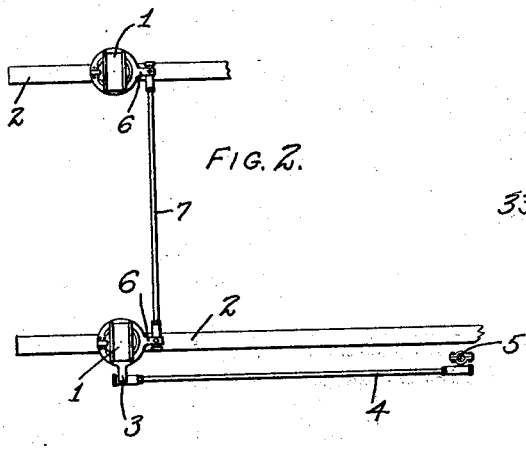
Fig. 2 is a plan view thereof.
Figure 12:
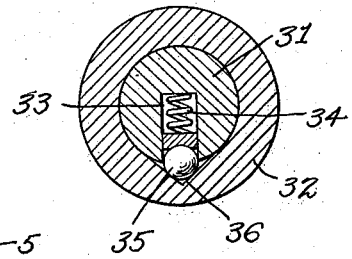

The modified construction shown in Figs. 11 and 12 comprises a lamp post 31 and its holding socket or sleeve 32. In this construction I form a radial bore 33 in the post and insert a spring 34 and ball 35 therein. The inner surface of the sleeve is cut away to provide V bearing surfaces 36 for the ball. The ball 35 under the action of the spring 34 normally centers the light and holds it in the forwardly directed position shown in Fig. 12. A turning of the light post obviously forces the ball into its bore 33. This construction is exceedingly cheap and simple and its operation is substantially the same as has been above described in connection with the first illustrated form of the invention.

I claim:

1. A dirigible light for automobiles, comprising the combination of a pressed sheet metal supporting member adapted to be mounted on a vehicle and including an outwardly extending horizontal flange portion, a pressed sheet metal light-supporting member mounted on the first member for pivotal movement thereon about a vertical axis and including an outwardly extending horizontal flange portion covering the first mentioned flange portion, means at the said axis holding the members together, means for connecting the pivotal member to the steering mechanism and adapted to automatically pivot the same in opposite directions in accordance with the movement of the steering mechanism, and means embodying a single spring carried by one of the members and acting on the other member to normally hold the light in its forwardly directed position, pivotal movement of the light from such position by the first mentioned means always being against the normal action of the resilient means.

2. A dirigible light for automobiles, comprising the combination of a supporting member adapted to be mounted on a vehicle, a light-supporting inverted cup-like member formed of sheet metal and mounted on the first member for pivotal movement thereon about a vertical axis and forming a housing for such first member, means for connecting the pivotal member to the steering mechanism and adapted to automatically pivot the same in opposite directions in accordance with the movement of the steering mechanism, and resilient means carried by one member and acting on the other member to normally hold the light in its forwardly directed position, pivotal movement of the light from such position to any position by the the first mentioned means always acting directly against the normal action of the resilient means.

3. A dirigible light for automobiles, comprising the combination of a pressed sheet metal supporting member adapted to be mounted on a vehicle and including an outwardly extending horizontal flange portion, a pressed sheet metal light-supporting member mounted on the first member for pivotal movement thereon about a vertical axis and including an outwardly extending horizontal flange portion covering the first mentioned flange portion, means at the said axis holding the members together, the flange portion of one of said members having a raceway about the axis, means in said raceway providing an anti-friction bearing between the two members, means for connecting the pivotal member to the steering mechanism and adapted to automatically pivot the same in opposite directions in accordance with the movement of the steering mechanism, and resilient means carried by one member and acting on the other member to normally hold the light in its forwardly directed position, pivotal movement of the light from such position by the first mentioned means always acting against the normal action of the resilient means.

4. A dirigible light for automobiles, comprising the combination of a pressed sheet metal supporting member adapted to be mounted on a vehicle and including an outwardly extending horizontal flange portion, a pressed sheet metal light-supporting member mounted on the first member for pivotal movement thereon about a vertical axis and including an outwardly extending horizontal flange portion covering the first mentioned flange portion and a downwardly extending edge flange thereon cupping over the said first member, means at the said axis holding the members together, means for connecting the pivotal member to the steering mechanism and adapted to automatically pivot the same in opposite directions in accordance with the movement of the steering mechanism, and resilient means carried by one member and acting on the other member to normally hold the light in its forwardly directed position, pivotal movement of the light from such position by the first mentioned means always being against the normal action of the resilient means.

5. A dirigible light for automobiles, comprising the combination of a pressed sheet metal member having an outwardly extending horizontal flange portion, supporting means connected to the member and adapted to mount the same on a vehicle, an inverted cup-shaped pressed sheet metal light-supporting member mounted on the first member for pivotal movement thereon about a vertical axis and having an outwardly extending horizontal flange portion covering and housing the first said flange portion, and resilient means carried by one member and acting on the other to normally hold the light-supporting member in a predetermined pivoted position.

6. A dirigible light for automobiles, comprising the combination of a pressed sheet metal member having an outwardly extending horizontal flange portion supporting means connected to the member and adapted to mount the same on a vehicle, an inverted cup-shaped pressed sheet metal light-supporting member mounted on the first member for pivotal movement thereon about a vertical axis and having an outwardly extending horizontal flange portion covering and housing the first said flange portion, said two members having cooperating ball-receiving recesses pressed into their adjacent faces about the said axis, anti-friction means in said recesses, and resilient means carried by one member and acting on the other member to normally hold the light-supporting member in a predetermined pivoted position.

In testimony whereof I affix my signature.

LAWRIE L. WITTER.